(12) United States Patent
Patel et al.

(10) Patent No.: US 7,162,486 B2
(45) Date of Patent: Jan. 9, 2007

(54) SYSTEM AND METHOD FOR REPRESENTING NAMED DATA STREAMS WITHIN AN ON-DISK STRUCTURE OF A FILE SYSTEM

(75) Inventors: Kayuri Patel, Cupertino, CA (US); Mark Muhlestein, Tuscon, AZ (US)

(73) Assignee: Network Appliance, Inc., Sunnyvale, CA (US)

( * ) Notice: Subject to any disclaimer, the term of this patent is extended or adjusted under 35 U.S.C. 154(b) by 548 days.

(21) Appl. No.: 10/657,573

(22) Filed: Sep. 8, 2003

(65) Prior Publication Data

US 2004/0059866 A1 Mar. 25, 2004

Related U.S. Application Data

(63) Continuation of application No. 09/891,159, filed on Jun. 25, 2001, now Pat. No. 6,643,654.

(51) Int. Cl.
*G06F 17/30* (2006.01)
*G06F 17/00* (2006.01)

(52) U.S. Cl. .................. 707/102; 707/205; 711/100

(58) Field of Classification Search .................. 707/1, 707/100, 10; 709/217; 711/100
See application file for complete search history.

(56) References Cited

U.S. PATENT DOCUMENTS 5,819,292 A   10/1998  Hitz et al.
5,948,110 A    9/1999  Hitz et al.
5,987,506 A *  11/1999  Carter et al. ............... 709/213
6,026,474 A *  2/2000  Carter et al. ............... 711/202
6,038,570 A    3/2000  Hitz et al.
6,556,998 B1 *  4/2003  Mukherjee et al. ........... 707/10
2002/0154645 A1 * 10/2002  Hu et al. .................... 370/401

OTHER PUBLICATIONS

U.S. Appl. No. 09/642,066, Ray Chen et al., filed Aug. 18, 2000.
SNIA Storage Network Industry Association: Common Internet File System (CIFS), Version: CIFS-Spec 0.9. Draft SNIA CIFS Work Group Work-in-Progress.

* cited by examiner

*Primary Examiner*—Alford W. Kindred
(74) *Attorney, Agent, or Firm*—Cesari and McKenna, LLP

(57) ABSTRACT

A technique provides on-disk representations of multiple named data streams for a file system of a network storage appliance. The network storage appliance or filer includes a file system that implements a Write Anywhere File Layout (WAFL) disk format, wherein files are described by inodes of which there may be various types, including directory and regular modes. A named stream mode type is defined that represents named data streams in the WAFL file system. Multiple data streams may be stored on disk(s) of the filer as representations embodying the named stream inode type associated with a file. The names and file handles of the data streams are stored in a "hidden" directory within the file system that is referenced by the base inode. The hidden directory is represented as a stream_dir inode type.

40 Claims, 5 Drawing Sheets

SYSTEM AND METHOD FOR REPRESENTING NAMED DATA STREAMS WITHIN AN ON-DISK STRUCTURE OF A FILE SYSTEM

CROSS-REFERENCE TO RELATED APPLICATION

The present application is a continuation of commonly assigned U.S. patent application Ser. No. 09/891,159, now U.S. Pat. No. 6,643,654, which was filed on Jun. 25, 2001, and issued on Nov. 4, 2003 to Kayuri Patel, et al, for a SYSTEM AND METHOD FOR REPRESENTING NAMED DATA STREAMS WITHIN AN ON-DISK STRUCTURE OF A FILE SYSTEM and is hereby incorporated by reference.

FIELD OF THE INVENTION

The present invention relates to file systems and, more specifically, to a system and method for representing named data streams within an on-disk structure of a file system.

BACKGROUND OF THE INVENTION

A network storage appliance is a special-purpose computer that provides file service relating to the organization of information on storage devices, such as disks. The network storage appliance or filer includes an operating system that implements a file system to logically organize the information as a hierarchical structure of directories and files on the disks. Each "on-disk" file may be implemented as set of disk blocks configured to store information, such as text, whereas the directory may be implemented as a specially formatted file in which information about other files and directories are stored. An example of a file system that is configured to operate on a filer is the Write Anywhere File Layout (WAFL™) file system available from Network Appliance, Inc., Santa Clara, Calif.

Broadly stated, the on-disk format representation of the WAFL file system is block-based using, e.g., 4 kilobyte (KB) blocks and using inodes to describe the files. An inode is a data structure used to store information, such as meta-data, about a file. That is, the information contained in an inode may include, e.g., ownership of the file, access permission for the file, size of the file, file type and location of the data for the file on disk. The WAFL file system uses a file handle, i.e., an identifier that includes an inode number, to retrieve an inode from disk. The WAFL file system also uses files to store meta-data describing the layout of its file system. These meta-data files include, among others, an inode file. The on-disk format structure of the WAFL file system, including the inodes and inode file, is disclosed and described in U.S. Pat. No. 5,819,292 titled *Method for Maintaining Consistent States of a File System and for Creating User-Accessible Read-Only Copies of a File System* by David Hitz et al., issued on Oct. 6, 1998 and assigned to the assignee of the present invention.

A file system designed for use with the Windows NT operating system is the NT™ file system (NTFS) available from Microsoft Corporation, Redmond, Wash. In NTFS, each unit of information associated with a file, including its name, its owner, its time stamps and its data contents, is implemented as a file attribute. Both files and directories have attributes, wherein each attribute consists of a single stream or sequence of bytes. This implementation facilitates the addition of more attributes, including data content attributes, to a file. Therefore, NTFS files and directories may contain multiple data streams. An NTFS file has one default data stream, $DATA, through which the file data is accessed, i.e., read and written; a directory, however, generally does not have a default data stream. Notably, an application can create additional named data streams for files and directories, and access them by referring to their names. The NTFS file system and multiple data streams are well known and described in *Inside the Windows NT File System* by Helen Custer, Microsoft Press, 1994.

A filer may be further configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link or a shared local area network. Each client may request the services of the filer by issuing file system protocol messages (in the form of packets) to the filer over the network. By supporting a plurality of file system protocols, such as the conventional Common Internet File System (CIFS) protocol for the Microsoft® Windows™ operating system, the utility of the filer may be enhanced for networking clients. File systems available from Microsoft Corporation and Apple Computer Inc. provide support ("representation") for the multiple named data streams feature of the NTFS file system; the present invention is generally directed to providing support for that feature within the WAFL file system.

Therefore, an object of the present invention is to provide a network storage appliance configured to represent and support multiple data streams.

Another object of the present invention is to provide an operating system of a filer that enables client applications to create, access and modify files stored on the filer by issuing requests directed to named data streams.

Yet another object of the present invention is to provide a file system capable of creating, accessing and modifying data stored on a filer in response to file system protocol packets embodying multiple named data stream requests.

SUMMARY OF THE INVENTION

The present invention comprises a technique for providing on-disk representations of multiple named data streams for a file system of a network storage appliance. In the illustrative embodiment, the network storage appliance or filer includes a file system that implements a Write Anywhere File Layout (WAFL) disk format, wherein files are described by inodes of which there may be various types, including directory and regular inodes. According to an aspect of the invention, a novel stream inode type is defined that represents named data streams in the WAFL file system. That is, multiple named data streams may be stored on disk(s) of the filer as representations embodying the stream inode type associated with a file. Each on-disk file may have a default data stream along with at least one named data stream representation.

Specifically, each stream inode has its own size, file share locks, byte range locks and data blocks. However, file attributes, such as time stamps, group and user ownership information, and access control lists are common for all named data streams and are stored in an on-disk base inode. The default data stream, along with its size, data blocks, file share locks and byte range locks, is also stored in the base inode. Additionally, the names and file handles of the data streams are stored in a "hidden" directory within the file system that is referenced by the base inode. According to another aspect of the invention, the hidden directory is represented as a novel stream_dir inode type. The hidden directory is "invisible" in a directory hierarchy that is viewed by a user (e.g., a client) external to the file system and, thus, is inaccessible through an external file system protocol, such as the Common Internet File System protocol.

Operations that can be applied to a named data stream include (i) create, (ii) delete, (iii) read and (iv) write operations. Broadly stated, in the case of a create operation, the WAFL file system "opens" a base inode associated with the default named stream, if it exists. Otherwise, the file system creates the base inode by allocating a free inode and inserting the name of the base inode into an entry of a parent directory. Next, the hidden directory is created (if it does not exist) and the base inode is configured to reference that directory. Thereafter, the file system allocates another free inode and inserts the name of the stream into the hidden directory, thereby creating the named stream. Each created named stream, or the entire inode with the hidden directory and its named streams, can be deleted in accordance with a delete operation.

Read access to a named stream in accordance with a read operation involves loading (from disk) the stream inode and its base inode into a memory of the filer. The base inode is loaded to update an access time stamp stored therein because, according to another aspect of the invention, time stamp attributes for named streams are represented by their base inodes. Data blocks associated with the base inode do not need to be retrieved from disk. However, the relevant data blocks associated with the named stream must be read from disk if they are not present in the memory so that the data contained therein may be retrieved and delivered to, e.g., the client issuing the read operation.

Similarly, write access to a named stream in accordance with a write operation involves loading the stream inode and its base inode. Here, the base inode is loaded into the memory to update a modification time stamp stored therein for the named stream. Data blocks that store the named stream data on disks are preferably referenced by the stream inode; those data blocks are updated (modified) as instructed by the write operation and the modified data are then written to disk. In addition, attributes of the named stream may be modified to reflect, e.g., a change in the size of the stream. For example, size information contained in the stream inode is updated if the write operation results in extending ("growing") of the file.

An access control list (security) of the base inode can be modified. Also, the name and size of each named stream can be listed. The base inode and the hidden directory (stream directory) are loaded from disk if they are not already present in memory, and the hidden directory is traversed to obtain the name of each named stream. Also each named stream inode is read from disk if it is not present in memory to retrieve its size. The name and size of each named stream may then be returned to the client.

Advantageously, the present invention allows an on-disk inode to have multiple named data streams representations, whereby the data blocks for each named stream can be retrieved independent from the data blocks of other streams. By storing different portions of data in different named streams, a client need only access those named stream data blocks of immediate and/or particular interest. Support for this multiple named stream feature reduces the amount of data that the WAFL file system needs to fetch from disk, thus increasing the efficiency of its data accesses and, notably, its file service provided to the client.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF THE ILLUSTRATIVE EMBODIMENTS

Figure 1:
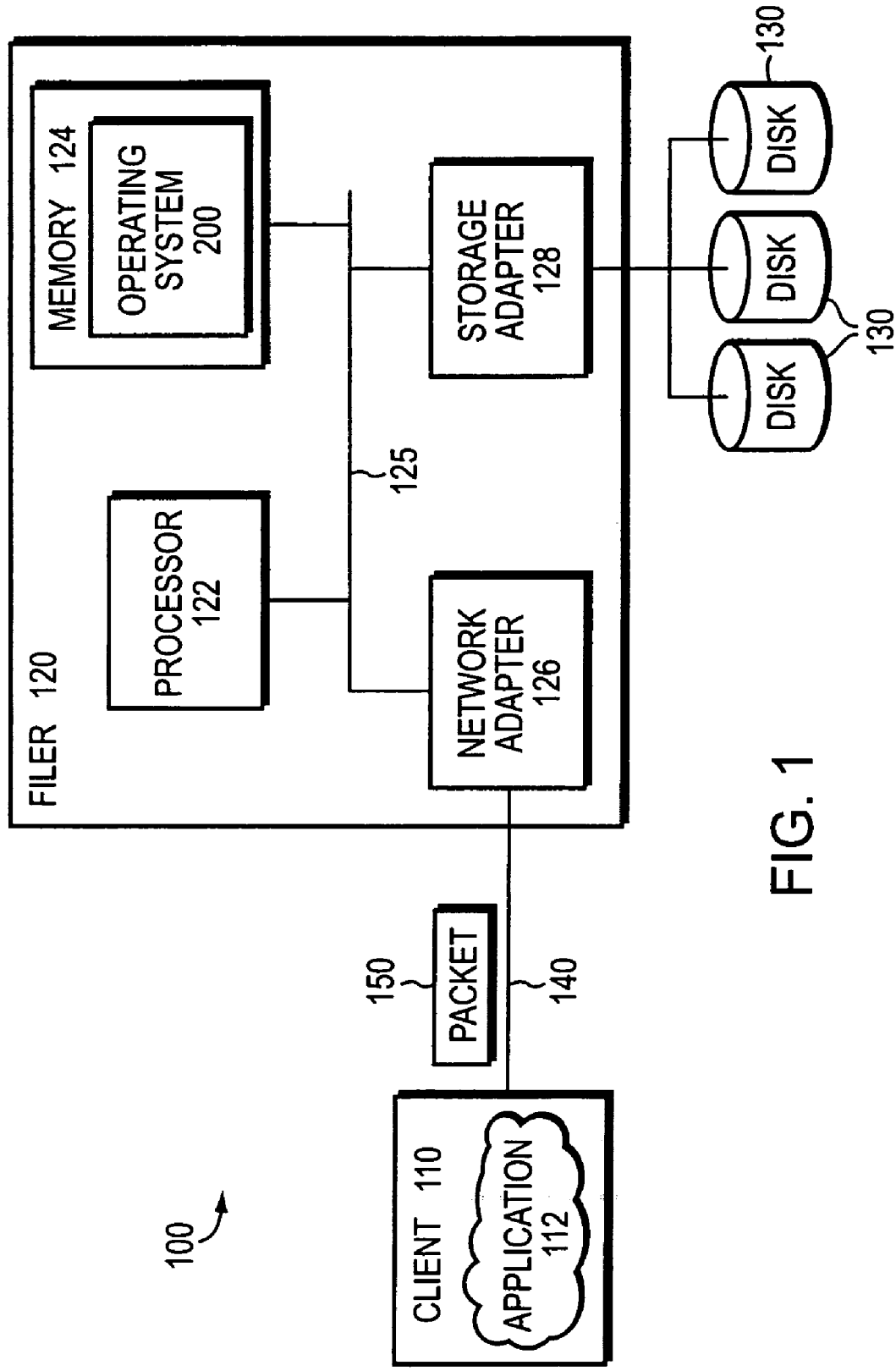
FIG. 1 is a schematic block diagram of a network environment including a network storage appliance that may be advantageously used with the present invention.

FIG. 1 is a schematic block diagram of a network environment 100 including a network storage appliance that may be advantageously used with the present invention. The network storage appliance or filer 120 is a special-purpose computer that provides file service relating to the organization of information on storage devices, such as disks 130. However, it will be understood to those skilled in the art that the inventive technique described herein may apply to any type of special-purpose (e.g., server) or general-purpose computer, including a standalone computer. The filer 120 comprises a processor 122, a memory 124, a network adapter 126 and a storage adapter 128 interconnected by a system bus 125. The filer 120 also includes an operating system 200 that implements a file system to logically organize the information as a hierarchical structure of directories and files on the disks.

In the illustrative embodiment, the memory 124 may have storage locations that are addressable by the processor and adapters for storing software program code and data structures associated with the present invention. The processor and adapters may, in turn, comprise processing elements and/or logic circuitry configured to execute the software code and manipulate the data structures. The operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications including file system protocols, such as the Common Internet File System (CIFS) protocol. Moreover, the client 110 may interact with the filer 120 in accordance with a client/server model of information delivery. That is, the client may request the services of the filer, and the filer may return the results of the services requested by the client, by exchanging packets 150 encapsulating, e.g., the CIFS protocol format over the network 140. The format of the CIFS protocol packet exchanged over the network is well known and described in *Common Internet File System (CIFS) Version: CIFS-Spec* 0.9, Storage Networking Industry Association (SNIA), Draft SNIA CIFS Documentation Work Group Work-in-Progress, Revision Date: Mar. 26, 2001 (hereinafter "CIFS specification"), which is hereby incorporated by reference as though fully set forth herein.

The storage adapter 128 cooperates with the operating system 200 executing on the filer to access information requested by the client. The information may be stored on the disks 130. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

To facilitate access to the disks 130, the operating system 200 implements a file system that logically organizes the information as a hierarchical structure of directories and files on the disks. Each "on-disk" file may be implemented as set of disk blocks configured to store information, such as text, whereas the directory may be implemented as a specially formatted file in which other files and directories are stored. In the illustrative embodiment described herein, the operating system is preferably the NetApp® Data ONTAP™ operating system available from Network Appliance, Inc. that implements a Write Anywhere File Layout (WAFL) file system.

Figure 2:
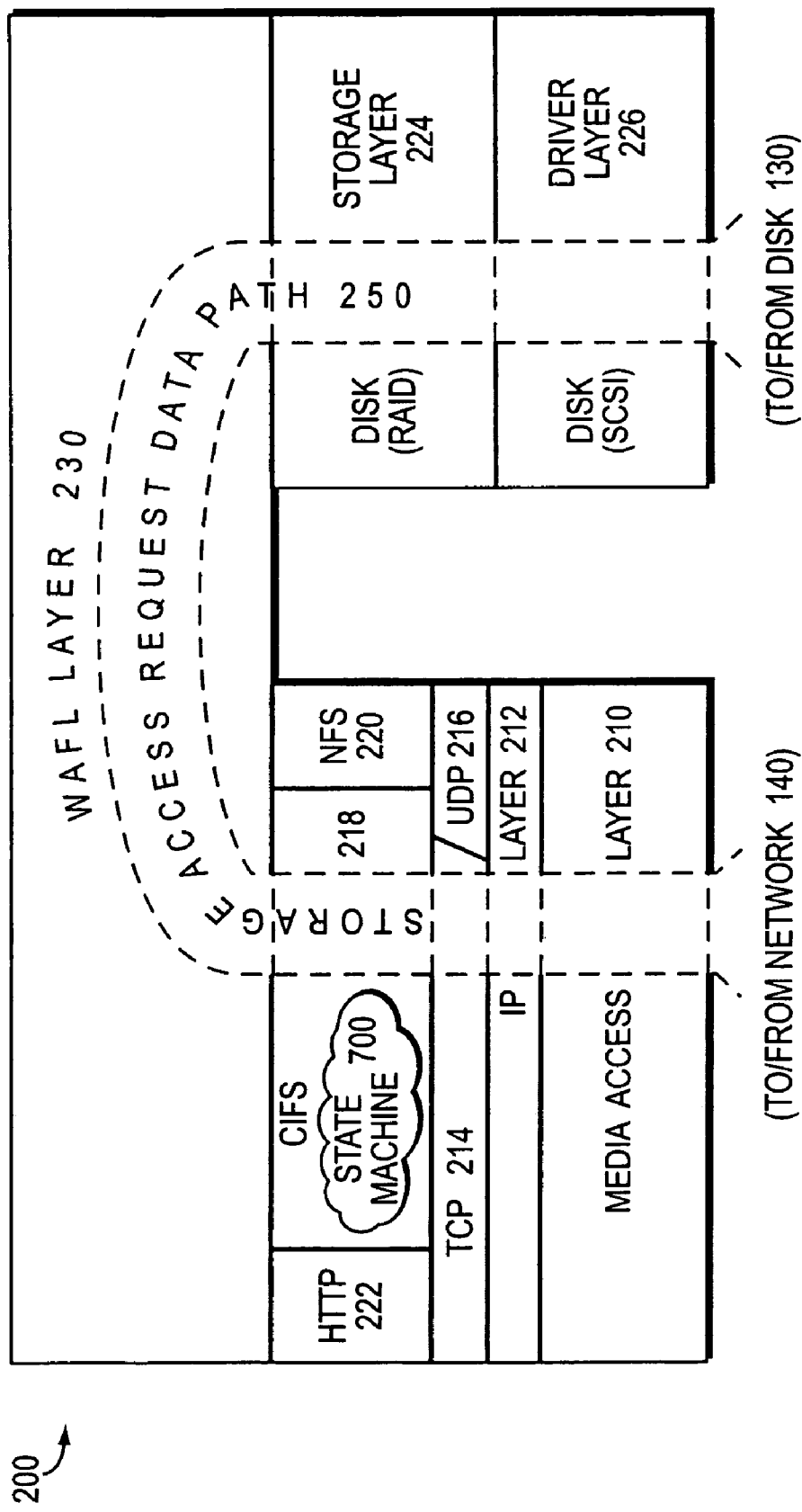
FIG. 2 is a schematic block diagram of an operating system including a file system protocol (CIFS) software layer and a file system (WAFL) software layer that may be advantageously used with the present invention.

FIG. 2 is a schematic block diagram of the Data ONTAP operating system 200 that may be advantageously used with the present invention. The operating system comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the Network File System (NFS) protocol 220 and the Hypertext Transfer Protocol (HTTP) protocol 222. In addition, the operating system 200 includes a disk storage layer 224 that implements a disk storage protocol, such as a Redundant Array of Independent Disks (RAID) protocol, and a disk driver layer 226 that implements a disk access protocol such as, e.g., a Small Computer Systems Interface (SCSI) protocol.

Bridging the disk software layers with the network and file system protocol layers is a WAFL file system layer 230 of the operating system. As described further herein, the layer 230 implements the WAFL file system having an on-disk format representation that is block-based using, e.g., 4 kilobyte (KB) data blocks and using inodes to describe the files. An inode is a data structure, e.g., a 128-byte structure, which is used to store information, such as meta-data, about a file. The meta-data contained in an inode may include, e.g., ownership of the file, access permission for the file, size of the file, file type and location of the file on disk. The WAFL layer uses a file handle, i.e., an identifier that includes an inode number, to retrieve an inode from disk. The WAFL layer 230 also uses files to store meta-data describing the layout of its file system. These meta-data files include, among others, an inode file.

Operationally, a request from the client 110 is forwarded as, e.g., a conventional CIFS protocol packet 150 over the computer network 140 and onto the filer 120 where it is received at the network adapter 126. A network driver of the media access layer 210 processes the packet, passes it onto the network protocol layers 212–214 and CIFS layer 218 for additional processing prior to forwarding to the WAFL layer 230. Here, the WAFL file system generates operations to load (retrieve) the requested data from disk 130 if it is not resident "incore", i.e., in memory 124. If the information is not in memory, the WAFL layer 230 indexes into the inode file using the inode number to access an appropriate entry and retrieve a logical volume block number. The WAFL layer then passes the logical volume block number to the disk storage (RAID) layer 224, which maps that logical number to a disk block number and sends the latter to an appropriate driver (e.g., SCSI) of the disk driver layer 226. The disk driver accesses the disk block number from disk 130 and loads the requested data in memory 124 for processing by the filer. Upon completion of the request, the filer (and operating system) returns a reply, e.g., a conventional acknowledgement packet defined by the CIFS specification, to the client 110 over the network 140.

It should be noted that the software "path" through the operating system layers described above needed to perform data storage access for the client request received at the filer may alternatively be implemented in hardware. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110. Moreover, in another alternate embodiment of the invention, the processing elements of network and storage adapters 126, 128 may be configured to offload some or all of the packet processing and storage access operations, respectively, from processor 122 to thereby increase the performance of the file service provided by the filer.

The present invention relates to the on-disk structure of multiple named data streams for the file system implemented on the filer. That is, the invention comprises a technique for providing (i) on-disk representation of multiple named data streams for the WAFL file system and (ii) organization of those data stream representations on disks 130 of the filer 120. An example of the use of multiple data streams may involve the creation of a document, having summary, main content and index sections, by word processor software, e.g., Microsoft Word, executing on the conventional Microsoft Windows NT operating system. By employing the multiple data streams feature of the NT file system (NTFS), the summary section may be stored at a location on disk that is separate from the main content and index sections of the document. This enables a user (e.g., a client) to retrieve just the summary section independent of those other sections of the document. Note that apportionment of the various sections (named data streams) associated with the document is arbitrary and user selectable, and that named data streams may be created for both files and directories (folders).

Figure 3:
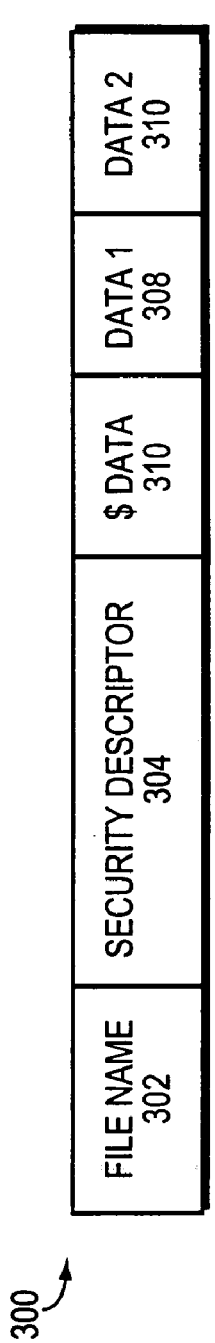
FIG. 3 is a schematic block diagram of a conventional master file table record.

Broadly stated, NTFS maintains a file called the master file table (MFT), which is the heart of the NTFS volume structure. The MFT is generally implemented as an array of file records. An MFT "row", representing one file on a disk, usually consists of one file record. FIG. 3 is a schematic block diagram illustrating a conventional MFT record 300 for a small file. A file in NTFS is defined as a set of attributes, including a filename attribute 302, a security descriptor attribute 304, and at least one data attribute. NTFS identifies an attribute by its name in upper case letters proceeded by a dollar sign ($), as in $FILENAME or $DATA. Each file attribute is stored as a separate stream of bytes within a file. NTFS supplies the following attribute operations: create, delete, read (byte range) and write (byte range). As noted, a document may be represented as a plurality of different sections, each represented by a data stream of a file. For example, the main content section of the document may be represented by the default data stream ($DATA 306), whereas the summary and index sections may be represented by named data streams, DATA1 308 and DATA2 310, respectively.

Figure 4:
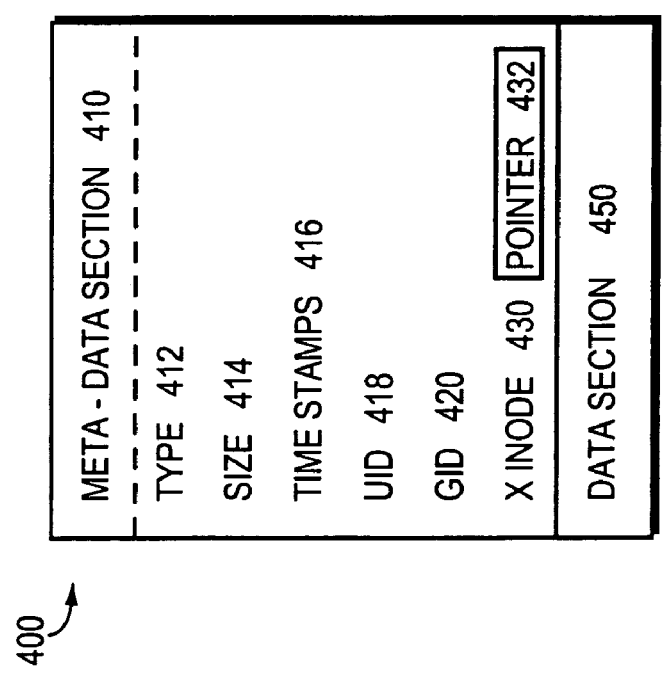
FIG. 4 is a schematic block diagram illustrating an on-disk inode data structure that may be advantageously used with the present invention.

In contrast, a file is represented in the WAFL file system as an inode data structure adapted for storage on the disks 130. FIG. 4 is a schematic block diagram illustrating the on-disk inode 400, which preferably includes a meta-data section 410 and a data section 450. The information stored in the meta-data section 410 of each inode 400 describes the file and, as such, includes the type (e.g., regular or directory) 412 of file, the size 414 of the file, time stamps (e.g., access and/or modification) 416 for the file and ownership, i.e., user identifier (UID 418) and group ID (GID 420), of the file. The metadata section 410 further includes a xinode field 430 containing a pointer 432 that references another on-disk inode structure containing, e.g., access control list (ACL) information associated with the file or directory. The contents of the data section 450 of each inode, however, may be interpreted differently depending upon the type of file (inode) defined within the type field 412. For example, the data section 450 of a directory inode contains meta-data controlled by the file system, whereas the data section of a regular inode contains user-defined data. In this latter case, the data section 450 includes a representation of the data associated with the file.

Specifically, the data section 450 of a regular on-disk inode may include user data or pointers, the latter referencing 4 KB data blocks on disk used to store the user data. Each pointer is preferably a logical volume block number to thereby facilitate efficiency among the file system and the disk storage (RAID) layer 224 when accessing the data on disks. Given the restricted size (128 bytes) of the inode, user data having a size that is less than or equal to 64 bytes is represented, in its entirety, within the data section of that inode. However, if the user data is greater than 64 bytes but less than or equal to 64 kilobytes (KB), then the data section of the inode comprises up to 16 pointers, each of which references a 4 KB block of data on the disk. Moreover, if the size of the data is greater than 64 kilobytes but less than or equal to 64 megabytes (MB), then each pointer in the data section 450 of the inode references an indirect inode that contains 1024 pointers, each of which references a 4 KB data block on disk. Each data block is loaded from disk 130 into memory 124 in order to access the data. In addition, the size field 414 of the meta-data section 410 of the inode refers to the size of the file.

Previously, the WAFL file system was capable of storing a representation of only one data stream (i.e., the default data stream, $DATA) relating to, e.g., an NTFS file. In other words, the file system described herein was previously unable to support the notion of storing and accessing multiple named data streams beyond the default data stream. The implementation described herein was motivated, in part, because the on-disk inode 400 has no free space available therein; i.e., the entire 128 bytes of the data structure 400 are used to represent some aspect of a file within the file system. However, other implementations free of this constraint may fall within the scope of the invention. The present invention extends the structure of the on-disk file system to accommodate multiple named data streams. That is, the present invention provides the ability for the WAFL file system to store these named data streams within its on-disk structure to thereby enable enhanced file service to clients that may request access to multiple named data streams. More specifically, the present invention is directed to a technique for efficiently storing and retrieving data associated with the multiple data streams as they are represented on disks 130 within the WAFL file system.

Referring again to FIG. 1, assume an application 112 executing on client 110 utilizes the notion of multiple data streams and that the client employs the filer 120 to store data that is organized and processed as multiple data streams. As described herein, the on-disk structure of the WAFL file system is extended to support representations of multiple data streams for filer 120. Packets 150 flowing over the network 140 may be formatted in accordance with any number of file system protocols, such as the CIFS protocol. As is known in the art, file system requests relating to multiple data streams are embodied within the CIFS protocol. For example, a file system request directed to the multiple data streams feature may be issued from the client 110 to the filer 120 within a packet 150 having a CIFS protocol "record" that may be generally represented as follows:

/pathname/filename:structure

In the illustrative embodiment, the packet 150 received at the filer 120 from the client 110 is preferably an IP packet that utilizes the TCP transport mechanism when carrying a record relating to the CIFS file system protocol. Each CIFS protocol record contains sufficient information for the WAFL file system to perform the requested operation. For example, if the request is directed to creating a file within a new folder, the CIFS record includes the name of the parent directory (folder) within which the file is to be created, along with the name of the file. Additionally, security (ACL) information may be included within the record. The internal format of the multiple data streams feature (object) implemented by the client 110 is not carried within the packet 150; only that information needed to create a representation of the object within the WAFL file system is provided within the CIFS protocol record of the packet. The CIFS specification defines an applications programming interface (API) used to enumerate the multiple data streams contained within the CIFS record.

The packet 150 is received at the media access layer 210 of the filer operating system 200 and passed through the network protocol network layers to the CIFS protocol layer 218, where the request (record) is interpreted as directed to a named data stream associated with a pathname and filename. The character (:) is a conventional separator between the filename and the data stream name, and is used to uniquely identify the association of a named data stream to a particular file of a file system. The pathname separated by the character (/) from the filename may represent directories or folders within the hierarchical structure of the file system.

When the file system record of the packet reaches the CIFS protocol layer 218, that record is transformed into a message structure that is forwarded to the WAFL file system layer 230. The WAFL file system is a message-based system and the CIFS protocol layer essentially apportions the packet into components that are transposed into individual messages for passing to the WAFL layer 230. These messages represent operations directed to the file system and, as such, include the type of operation (e.g., create, delete, read, write) along with any data associated with that operation. The CIFS protocol portion of the packet 150 has a well-known format defined by the CIFS specification and includes, among other things, a header that contains information identifying the type of requested operation. Depending on the type of requested operation, there may be additional information describing that operation.

For example, if an operation requested by client 110 is a "create" operation, then the additional information may include a name associated with the directory, file or named data stream to be created along with permissions, such as ACLs, associated with that directory, file or stream. The CIFS protocol layer 218 processes the incoming CIFS record and creates at least one message that is passed into the WAFL layer as, e.g., a function call, where the operation is performed. The WAFL file system then utilizes the information contained in the message call to create the directory, file or stream within the file system structure implemented on the disks 130.

According to an aspect of the inventive technique, the CIFS layer 218 parses the CIFS record at the (:) to retrieve the </pathname/filename> included within the record. The CIFS layer then examines the named stream <structure>. Since the data stream name is located to the right of the defining (:), the layer 218 determines that it is a valid name and, therefore, attempts to create a file for that named stream. The CIFS layer further parses the </pathname/filename> at the (/) character in an attempt to create or "map" the directory and file to the internal structure of the WAFL file system.

Figure 5:
FIG. 5 is a schematic block diagram of the format of a message generated by the CIFS layer and forwarded to the WAFL layer of the operating system of FIG. 2.

FIG. 5 is a schematic block diagram of the format of a message 500 generated by the CIFS layer and forwarded to the WAFL layer 230 when determining whether to create a directory and file for a named stream. The CIFS layer 218 generates the message 500 having a type of operation field 510 (i.e., create) and specifying the pathname (directory) and filename (file) of the objects to be represented in the file system. Assume the pathname is "DIR1", the filename is "foo" and the named stream is "STREAM1", such that the record syntax may be represented as "/DIR1/foo: STREAM1". Therefore, the CIFS layer loads a pathname field 520 of message 500 with "/DIR1", a filename field 530 with "foo" and, if necessary, a named stream field 540 with "STREAM1"; the layer 218 then forwards the message to the WAFL layer 230.

Figures 6, 7:
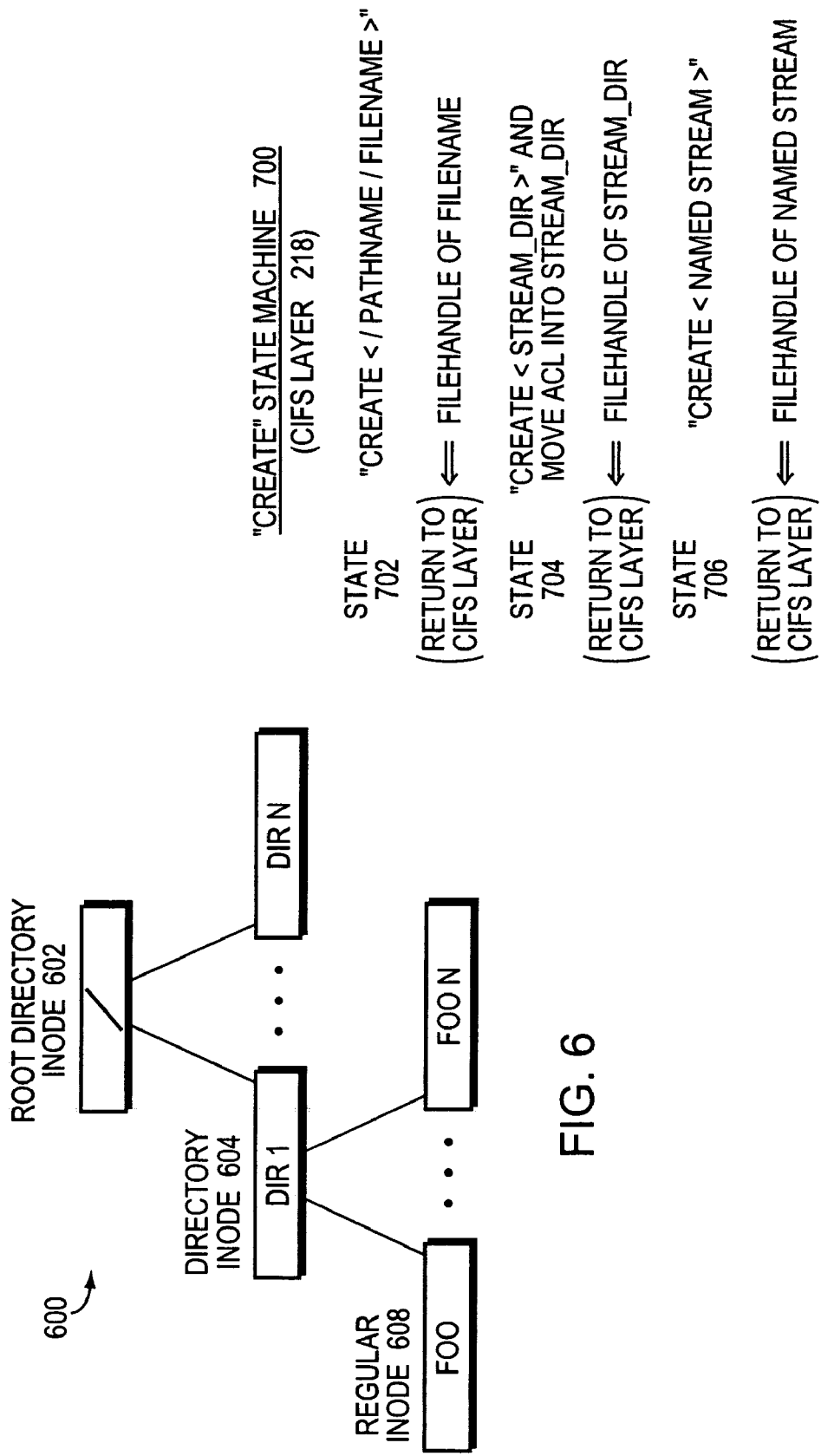
FIG. 6 is a schematic block diagram illustrating a hierarchical on-disk inode structure of the WAFL file system.
FIG. 7 is a schematic illustration of various states of a create state machine process executing within the CIFS layer of the operating system of FIG. 2.

In response to receiving the message 500, the WAFL layer determines whether inodes for the pathname (directory) and filename (file) exist within its on-disk file system structure so that it may create the named data stream associated with the file. FIG. 6 is a schematic block diagram illustrating the hierarchical on-disk inode structure 600 of the WAFL file system. Specifically, the WAFL layer 230 parses the first (/) preceding the pathname and maps it to a root inode structure 602 of its file system. The root inode is a directory having a plurality of entries, each of which stores a name of a directory and its corresponding mapping file handle. Armed with a file handle, the operating system 200 can convert that handle to a disk block and, thus, retrieve the block (inode) from disk.

Broadly stated, a name is an external representation of an inode data structure, i.e., a representation of the inode as viewed external to the file system. In contrast, the file handle is an internal representation of the data structure, i.e., a representation of the inode data structure that is used internally within the file system. The file handle generally consists of a plurality of components including a file ID (inode number), a snap-shot ID, a generation ID and a flag. The file handle is exchanged among the client and server (filer) over the network to enable the filer to efficiently retrieve the corresponding file or directory. That is, the file system may efficiently access a file or directory by mapping its inode number to a block on disk using the inode file. Use of the file handle thus obviates the need to exchange pathnames and perform lookup operations to retrieve the appropriate file or directory inode from disk. The filer returns (to the client) a file handle corresponding to a file upon completion of an operation.

Accordingly, the WAFL layer loads the root directory inode 602 from disk 130 into memory 124, such that the root inode is represented as an incore inode, and loads any data blocks referenced by the incore root inode. The WAFL layer then searches the contents of the root inode data blocks for a directory name "DIR1". If the DIR1 directory name is found in those data blocks, the WAFL layer uses the corresponding file handle to retrieve the DIR1 directory inode 604 from disk and loads it (and its data blocks) into memory as incore inode structure(s). As with the root inode, the directory inode has a plurality of entries; here, however, each entry stores a name of a regular file and its corresponding mapping file handle.

The WAFL layer 230 searches the entries of the DIR1 directory inode data blocks to determine whether the regular inode file name "foo" exists and, if so, obtains its corresponding file handle (inode number) and loads the regular inode 608 from disk. The WAFL layer then returns the file handle for the file "foo" to the CIFS layer 218 of the operating system. Note that the default data stream is embodied in the regular inode "foo". A description of the structure of the WAFL file system, including the on-disk/incore inodes and inode file described above, is provided in U.S. Pat. No. 5,819,292, titled *Method for Maintaining Consistent States of a File System and for Creating User-Accessible Read-Only Copies of a File System* by David Hitz et al., issued Oct. 6, 1998, which patent is hereby incorporated by reference as though fully set forth herein.

Figure 8:
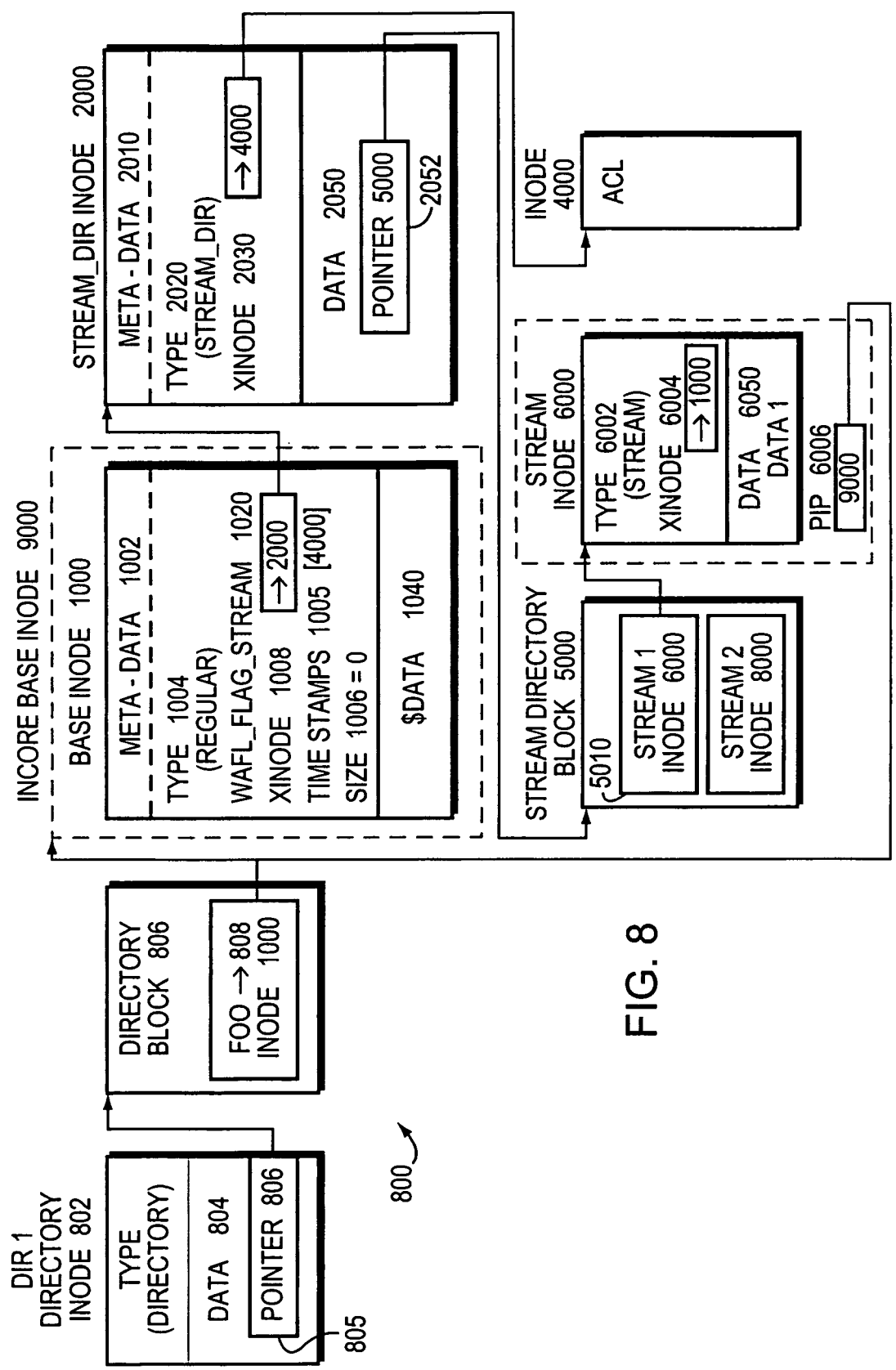
FIG. 8 is a schematic block diagram illustrating an on-disk representation of inode data structures, including novel stream and stream directory inodes, in accordance with the present invention.

Assume that the directory DIR1 inode 604 exists but the file "foo" does not exist. The CIFS protocol layer cooperates with the WAFL layer to create inode data structures, including the named data stream "STREAM1". To that end, the CIFS layer 218 includes a state machine 700 configured to handle/manage the creation of named data stream inodes. FIG. 7 is a schematic illustration of various states of the "create" state machine process 700 executing within CIFS layer 218 of the operating system 200. FIG. 8 is a schematic block diagram illustrating an on-disk representation 800 of inode data structures (e.g., directory, regular and stream inodes) that are created and processed by the WAFL file system in response to the states of the CIFS layer state machine 700.

Upon entering a first state 702 of the CIFS state machine 700, the CIFS layer generates and sends a message, e.g., "create </pathname/filename>", to the WAFL layer 230. The DIR1 directory inode (shown in FIG. 8 at 802) includes a data section 804 of pointers 805 that references directory data blocks, one of which is directory block 806. The WAFL layer 230 allocates a free inode, searches for a free entry 808 for the filename "foo" within (parent) directory block 806 and assigns that entry a pointer that references the free inode having, e.g, inode number 1000. Each entry of the directory block contains the external representation of an inode (i.e., the name of the inode) along with mapping information (i.e., the inode number) for that inode. By maintaining the names of all files (or folders) within entries of a directory block, a listing of those names may be obtained by loading the directory block into the memory 124.

Allocation of the entry 808 essentially results in the creation of inode 1000 and, accordingly, the WAFL layer 230 proceeds to initialize the contents of that inode by, e.g., inserting information into the meta-data section 1002 of the inode. The meta-data inserted into the inode 1000 includes the type 1004 of the file (i.e., regular) and the size 1006 of the file which, upon creation of the inode, is zero. Other meta-data may include a reference to an ACL inode that, as noted, is used to store ACL information for a particular file or directory and which is identified as xinode pointer 1008. Upon initialization of the regular inode 1000, the WAFL layer 230 returns the file handle (hereinafter inode number 1000) of the file "foo" to the CIFS layer 218.

The next state 704 of the CIFS state machine 700 involves creation of a stream directory. Here, the on-disk WAFL file system structure is extended to include the novel stream directory that is provided to support named data stream file service and that is preferably a "hidden" directory. In other words, the stream directory is "invisible" in a directory hierarchy that is viewed by a user (e.g., a client) external to the file system and is inaccessible through an external file system protocol, such as the CIFS protocol. It should be noted that the stream directory "looks" like a typical directory inode internal to the WAFL file system and, as such, is configured to operate in connection with applicable file system directory algorithms. However, in accordance with another aspect of the invention, the stream directory is represented as a novel stream_dir inode type (as denoted within the type field of the inode) that renders the inode hidden and prevents it from being viewed externally by a client over the network.

In response to entering state 704 of its create state machine 700, the CIFS layer 218 generates a new message, e.g., "create <stream_dir>" and forwards it to the WAFL layer 230. Included within the message is the file handle (inode number 1000), denoting the file to which the stream directory is to be associated. Upon receiving the message, the WAFL layer 230 extracts the inode number 1000 and uses it to load the inode 1000 from disk 130 into memory 124. To create the stream directory, the WAFL layer 230 asserts a novel flag within the inode 1000 that essentially transforms that inode into a "base" inode having more than one data "fork" (or associated data section).

Specifically, the novel flag is a WAFL_flag_stream flag 1020 that identifies the inode 1000 as having not only a default data stream section ($DATA) but also one or more named data stream "sections". In addition, a free inode is allocated and converted to a stream_dir inode 2000 upon insertion of the type "stream_dir" into type field 2020 by the WAFL layer. Although the inode 1000 includes the default data stream ($DATA) within data section 1040, the stream_dir inode 2000 is created to enable storage of the named data streams within the on-disk structure of the file system. In order to access the newly created stream directory, the pointer of xinode field 1008 in base inode 1000 is modified to reference the stream_dir inode 2000 allocated for the stream directory.

In accordance with another aspect of the present invention, the novel stream directory 2000 includes a data section 2050 of pointers 2052 that references stream directory data blocks associated with named data streams, one of which is stream directory block 5000. As noted, the xinode field of an inode typically references an inode dedicated to storing ACL information. Since the entire 128-byte capacity of each inode is utilized, the invention "overloads" the xinode field of a base inode to reference the novel stream directory. Thus, the xinode field 1008 of the base inode 1000 is configured to reference the novel stream_dir inode 2000. The WAFL file system differentiates the functions of the xinode field (i.e., referencing an ACL inode or a stream directory inode) by, among other things, the assertion of the WAFL_flag_stream flag within a base inode. In particular, assertion of the WAFL_flag_stream flag 1020 denotes use of the xinode pointer to reference a stream directory inode.

In accordance with yet another aspect of the present invention, the WAFL file system "moves" (copies) the original pointer of the xinode field that references the ACL inode (e.g., inode 4000) from the base inode 1000 to the stream directory inode 2000. The meta-data section 2010 of the stream directory thus includes a xinode field 2030 having a pointer 4000 that references inode 4000 containing the ACL information for the base inode file "foo". Note that the stream directory and base inodes are "dirtied" so that they may be subsequently "flushed" (written) to disk. As a result of the creation of the stream directory in state 704, the WAFL layer 230 returns (to the CIFS layer 218) the file handle of the stream directory that, illustratively, is inode number 2000. It should be further noted that the stream directory inode is the WAFL file system's representation of the (:) used to uniquely define data streams within the NTFS convention.

The next state 706 of the create state machine 700 involves creation of the named data stream, hereinafter "STREAM1". In response to entering state 706, the CIFS layer 218 generates and sends a new message, e.g., "create <named stream>", along with the file handle (inode number 2000) of the stream directory to the WAFL layer 230. The CIFS layer also passes to layer 230 the file handle of base inode 1000 for updating, e.g., time stamps. The WAFL layer users the inode number 2000 to load the stream_dir inode 2000 from disk 130 into the memory 124, if it is not already in memory. In addition, the CIFS layer forwards the name of the stream to be created, e.g., STREAM1, to the WAFL layer 230. After loading the stream_dir inode 2000, the WAFL layer loads the stream directory data blocks (e.g., block 5000) referenced by the data section 2050 of inode 2000 to determine whether the STREAM1 inode exists.

If the STREAM1 inode does not exist in the stream directory block 5000, the WAFL layer 230 allocates a free inode and searches for a free entry for the filename STREAM1 within the block 5000. Upon locating free entry 5010, the layer 230 assigns that entry a pointer that references the free inode with a file handle, e.g., inode number 6000. Allocation of the entry 5010 commences the creation of inode 6000 and, accordingly, the WAFL layer 230 proceeds to initialize the contents of that inode by, inter alia, designating yet another new stream type to the named data stream inode 6000. The new stream inode type is used to represent the named stream because, e.g., certain operations applicable to files, such as renaming of the files, are not permitted on named data streams.

The WAFL layer 230 thus inserts the type "stream" into type field 6002 to convert the free inode to stream inode 6000, thereby completing creation of that inode. Note that the newly created stream inode 6000 is initially of size zero. This procedure may be repeated to create another named stream (STREAM2) having an allocated stream inode 8000 with a data section that references user data blocks (e.g., DATA2) associated with that named stream. Upon completion of state 706, the named data stream is created and represented within the WAFL file system structure as a novel stream inode. Note also that after creation, each inode is marked dirty so that it may be subsequently flushed to disk. The WAFL layer then returns the file handle of the named stream (e.g., inode number 6000) to the CIFS layer 218 and the create operation completes.

It should be further noted that all of the inodes associated with the named data streams (e.g., the base inode 1000, the stream_dir inode 2000 and the stream inode 6000) use the same ACL information contained within appropriate ACL inode of the WAFL file system. The meta-data attributes (e.g., time stamps and ownership information) for the named data stream reside within the base inode for that named stream. As a result, when a stream inode is modified, its base inode must be loaded into memory so that its meta-data section may be updated to reflect the modification. In accordance with yet another aspect of the present invention, the xinode field of each named stream inode is modified to function as a back pointer to its base inode. The function of the xinode field can be distinguished based upon the type of inode; i.e., the novel stream inode type does not have an xinode field that references ACL information because its ACL "lives" (is referenced by) the base inode.

While there has been shown and described an illustrative embodiment for providing on-disk representations of multiple named data streams for a file system of a network storage appliance, it is to be understood that various other adaptations and modifications may be made within the spirit and scope of the invention. For example, the present invention also contemplates an "incore" representation of the named data streams described herein. In general, when an on-disk inode is loaded from disk 130 into memory 124, its corresponding incore inode representation may include additional information, such as a back pointer to its incore base inode and a pointer to an incore ACL inode. The dotted lines surrounding the inodes shown in FIG. 8 indicate the incore representation of the on-disk inode structures.

Specifically, when an on-disk inode is loaded "incore" to the memory 124, the corresponding incore inode structure "embeds" the on-disk inode structure. The incore inode is a block of memory that stores the on-disk inode structure plus additional information needed to manage data in the memory (but not on disk). This additional information may include a parent inode pointer (pip) that is an incore pointer used to reference the beginning of an incore base inode from, e.g., an incore stream inode. In other words, the pip represents a physical address of an incore inode within the memory 124, whereas the pointer references a logical address (e.g., inode number 2000 that maps to a logical volume block) on disk.

Assume now that the client 110 desires to store (write) information for the newly created named data stream in accordance with a write operation. The client sends a CIFS record within an IP packet (along with the write data) over the network 140 to the filer 120 where the packet is passed up the software layers to the CIFS layer 218, which parses the record. The CIFS protocol layer then creates a new message "write <named stream>" and passes that message, along with the file handle (inode number 6000) of the named stream and write data, to the WAFL layer 230. In response, the WAFL layer searches for the named stream inode in memory 124, and if it is not there, uses the inode file to locate the inode 6000 on disk and load it into memory.

Upon retrieving the inode 6000 (and its referenced data block, DATA1) from disk and determining that it is a stream inode, the WAFL layer examines the content of its xinode field 6004, which contains a pointer to inode 1000. Therefore, the layer 230 loads the corresponding base inode 1000 from disk into memory, if it is not already there. The WAFL file system then configures the pip 6006 that enables the incore stream inode to easily reference the incore base inode.

As part of the write operation, data section 1040 of inode 1000 is extended to include pointers that reference the actual user data blocks (e.g., $DATA) associated with the default data stream. After updating (modifying) the data in the stream inode data block as instructed by the write operation, the WAFL layer marks the modified data as "dirty" so that it can be subsequently flushed to disk. The WAFL system then uses the pip 6006 to access the incore base inode 1000 in order to update time stamps 1005 (e.g., a modification time stamp) contained within the meta-data section 1002 of the base inode. In addition, attributes of the named stream may be modified to reflect, e.g., a change in the size of the stream. For example, size information contained in the stream inode is updated if the write operation results in extending ("growing") of the file. The layer 230 also marks the base and stream inode as "dirty" so that they may be subsequently flushed to disk. This essentially completes the write operation.

Read access to a named stream in accordance with a read operation involves loading the stream inode and its base inode into memory from disk if the inodes are not already in memory, as described in connection with the write operation. The base inode is loaded because, in response to accessing the stream inode for purposes of reading its data, the WAFL layer modifies an access time stamp within the base inode. Accordingly, the base inode is dirtied to ensure that it is flushed to disk. Data blocks associated with the base inode do not need to be retrieved from disk. However, the data block(s) associated with the named stream must be read from disk if they are not present in the memory so that the data contained therein may be retrieved and delivered to, e.g., the client issuing the read operation. This essentially completes the read operation.

Another operation applied to named data streams is a "list" operation that is issued by client 110 to list the names and sizes of the named data streams associated with a file. The list request is accompanied by the file handle of the file and is passed to the CIFS layer, which creates a message that is forwarded (along with the file handle of the file) to the WAFL layer. In response, the WAFL file system loads the inode referenced by the file handle, e.g., the base inode 1000, and determines whether the WAFL_flag_stream flag 1020 is asserted. If so, the WAFL layer 230 loads the stream_dir inode 2000 referenced by the xinode field 1008 of the inode 1000 and then loads the stream directory block 5000 referenced by the data section 2050 of the stream_dir inode. Thereafter, WAFL layer loads the appropriate stream inodes referenced by the block 5000. The layer 230 then returns the names of the stream inodes (retrieved from the stream directory block 5000), along with the sizes of each stream inode (stored in the meta-data section of each stream inode), to the CIFS layer which, in turn, returns the information to the client 110. The size information is included within the stream inode because it is an attribute of data (associated with the particular section of the document).

Yet another operation pertaining to named data streams is a delete operation. Each created named stream, or the entire inode with the hidden directory and its named streams, can be deleted in accordance with the delete operation. For example in response to deleting a particular file (filename), not only is the base inode associated with that filename deleted from the WAFL file system, but the trailing chain of inodes directed to the named streams are also deleted. The delete operation is preferably performed in an efficient manner that allows a prompt reply to the client.

Broadly stated, a "zombie" daemon within the WAFL layer 230 converts the type field within an inode to a predefined "zombie" type that essentially prevents return of its file handle to the client. As part of the conversion process, the generation number component of the internal file handle is incremented such that it does not match the generation component of the external file handle provided to the client. As a result of the mismatch between those generation numbers, the WAFL system does not return data (or acknowledgement) associated with the requested operation to the client. In addition, the delete operation removes the reference of the file handle from the directory. The zombie daemon then "walks" a tree of stream_dir and stream inodes (and their associated data blocks), essentially "freeing up" the blocks, deallocating those inodes and freeing up those structures by placing them back into a free pool of inodes. The delete operation is described in co-pending and commonly-assigned U.S. patent application Ser. No. 09/642,066, titled *Manipulation of Zombie Files and Evil-Twin Files* by Ray Chen et al., which application is hereby incorporated by reference as though fully set forth herein.

In sum, the present invention advantageously allows an on-disk inode to have multiple named data streams representations, whereby the data blocks for each named stream can be retrieved independent from the data blocks of other streams. By storing different portions of data in different named streams, a client need only access those named stream data blocks of immediate and/or particular interest. Support for this multiple named stream feature reduces the amount of data that the WAFL file system needs to fetch from disk, thus increasing the efficiency of its data accesses and, notably, its file services provided to the client.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A storage system adapted to provide on-disk representations of one or more predetermined files served by the storage system, the system comprising:
   an operating system resident in a memory and invoking storage operations in support of a file system configured to logically organize information as a hierarchical structure of directory and file modes on the disk, each of the files having one or more associated file attributes stored on the disk as a representation embodying a stream inode associated with a file inode.

2. The storage system of claim 1 wherein each on-disk file inode includes a reference to at least one stream inode.

3. The storage system of claim 1 wherein the predetermined file comprises a NTFS file.

4. The storage system of claim 1 wherein the stream inode comprises a type field designating the stream inode as a stream type.

5. A multi-protocol data access storage system adapted to provide on-disk representations of at least one file served by the storage system, the system comprising:
   an operating system resident in a memory of the storage system and configured to invoke storage operations in support of a file system configured to logically organize information as a hierarchical structure of directory and file inodes on the disk, the operating system including a file system protocol layer configured to provide data access in support of a plurality of file system protocols, each of the files stored on the disk as a representation embodying a stream inode associated with a file inode.

6. The storage system of claim 5 wherein each on-disk file inode includes a reference to at least one stream inode.

7. The storage system of claim 6 wherein each on-disk file inode includes a default stream.

8. The storage system of claim 5 wherein the stream inode comprises a type field designating the stream inode as a stream type.

9. A system adapted to provide on-disk representations of at least one file within a filer, the system comprising:
   a processor;
   a memory coupled to the processor and having locations addressable by the processor;
   at least one disk coupled to the memory and processor; and
   an operating system resident in the memory locations and invoking storage operations in support of a file system configured to logically organize information as files on the disk, each of the files stored on the at least one disk as a representation embodying a stream inode associated with a file inode.

10. The system of claim 9 wherein each on-disk file inode includes a default data stream.

11. The system of claim 9 further comprising a storage adapter interconnected with the processor, memory and disk, the storage adapter cooperating with the operating system to access the information stored on the disk.

12. The system of claim 9 further comprising a network adapter coupled to the processor and memory of the filer, the network adapter connecting the filer to a client over a computer network, the client interacting with the filer by exchanging packets encapsulating a record requesting file services from the filer using a file system protocol over the network.

13. The system of claim 12 wherein the file system protocol is a Common Internet File System (CIFS) protocol and wherein the record is a CIFS record comprising information pertaining to an operation directed to the named stream inode.

14. The system of claim 13 wherein the operating system comprises a series of software layers, including a file system protocol layer configured to support the CIFS protocol and a file system layer.

15. The system of claim 14 wherein the CIFS record is interpreted as directed to a named data stream associated with a file and transformed into a message structure by the CIFS layer, and further passed to the file system layer, where the operation is performed.

16. The system of claim 15 wherein the message is passed from the CIFS layer to the file system layer as a function call.

17. The system of claim 15 wherein the file system layer loads the stream inode from disk into memory and accesses the stream inode as instructed by the operation.

18. The system of claim 14 wherein the operating system further comprises a media access layer of network drivers, network protocol layers, a disk storage layer that implements a disk storage protocol and a disk driver layer that implements a disk access protocol.

19. The system of claim 18 wherein a storage access request data path through the operating system layers enables performance of data storage access for the client request received at the filer.

20. The system of claim 19 wherein the storage access request data path is implemented as logic circuitry embodied within a hardware circuit.

21. The system of claim 9 wherein at least one of the files is stored on the at least one disk as a representation embodying the stream inode associated with a stream directory inode, the stream directory inode further associated with the file inode.

22. The system of claim 21 wherein the stream directory inode comprises a type field designating the stream directory inode as a stream directory type.

23. The system of claim 21 wherein the stream directory inode is further associated with a stream directory, and wherein the stream directory is a hidden directory.

24. The system of claim 21 wherein the stream directory inode comprises a data section including a pointer referencing a stream directory data block associated with the stream inode.

25. The system of claim 21 wherein the file inode comprises a flag identifying the file inode as being associated with a plurality of data streams.

26. The system of claim 25 wherein the file inode comprises a data section including a default data stream.

27. The system of claim 21 wherein the stream directory inode comprises a first pointer referencing an access control list inode associated with access control list information.

28. The system of claim 27 wherein the file inode comprises a second pointer referencing the access control list inode, the first pointer comprising a copy of the second pointer, and wherein the second pointer is modified to reference the stream directory inode.

29. The system of claim 9 wherein the stream inode comprises a type field designating the stream inode as a stream type.

30. The system of claim 9 wherein the stream inode comprises a pointer referencing the file inode.

31. The system of claim 9 wherein the file inode includes a reference to the stream inode.

32. The system of claim 9 wherein the memory is further configured to store an incore inode structure comprising a representation of the file inode and a representation of the stream inode.

33. The system of claim 32 wherein the stream inode comprises a pointer referencing the file inode, and wherein the representation of the stream inode comprises a pointer referencing the representation of the file inode.

34. The system of claim 32 wherein the representation of the file inode comprises a copy of the file inode, and wherein the representation of the stream inode comprises a copy of the stream inode.

35. The system of claim 9 wherein the filer comprises a multi-protocol data access storage system.

36. A method of representing information served by a storage system, the method comprising the steps of:
  organizing the information as a plurality of files associated with a plurality of inodes on a disk, wherein each inode of the plurality of inodes comprises metadata associated with a corresponding file of the plurality of files and further comprises one or more references to a one or more data blocks on the disk;
  associating a first inode of the plurality of inodes with a first file of the plurality of files as a file inode;
  organizing a logically contiguous stream of data blocks within the first file as a data stream; and
  associating a second inode of the plurality of inodes with the data stream as a stream inode.

37. The method of claim 36 wherein a reference of the plurality of references of the file inode comprises a reference to the stream inode.

38. The method of claim 36 wherein the plurality of inodes further comprises a plurality of directory inodes, each directory inode comprising metadata associated with a corresponding directory of a plurality of directories and further comprising references to at least one inode of the plurality of inodes.

39. The method of claim 38 wherein a given reference of the references to at least one inode comprises a first pointer referencing a directory data block of the plurality of data blocks, the directory data block comprising a second pointer referencing the at least one inode.

40. The method of claim 38 wherein a given directory inode of the plurality of directory inodes further comprises a stream directory inode associated with the file inode and referencing the stream inode.

* * * * *

UNITED STATES PATENT AND TRADEMARK OFFICE
CERTIFICATE OF CORRECTION

| | |
|---|---|
| PATENT NO. | : 7,162,486 B2 |
| APPLICATION NO. | : 10/657573 |
| DATED | : January 9, 2007 |
| INVENTOR(S) | : Kayuri Patel et al. |

Page 1 of 1

It is certified that error appears in the above-identified patent and that said Letters Patent is hereby corrected as shown below:

Column 15,
Line 6, delete "modes" substitute --inodes--

Signed and Sealed this

Eighteenth Day of September, 2007

JON W. DUDAS
*Director of the United States Patent and Trademark Office*